(12) United States Patent
Torres

(10) Patent No.: US 12,315,385 B1
(45) Date of Patent: May 27, 2025

(54) DEVICE FOR LEARNING OR TEACHING COMPUTER PROGRAMMING

(71) Applicant: Jorge Luis Torres, Tamarac, FL (US)

(72) Inventor: Jorge Luis Torres, Tamarac, FL (US)

( * ) Notice: Subject to any disclaimer, the term of this patent is extended or adjusted under 35 U.S.C. 154(b) by 849 days.

(21) Appl. No.: 17/537,867

(22) Filed: Nov. 30, 2021

Related U.S. Application Data

(60) Provisional application No. 63/119,937, filed on Dec. 1, 2020.

(51) Int. Cl.
 *G09B 19/00* (2006.01)

(52) U.S. Cl.
 CPC .............................. *G09B 19/0053* (2013.01)

(58) Field of Classification Search
 None
 See application file for complete search history.

(56) References Cited

U.S. PATENT DOCUMENTS

| | | | |
|---|---|---|---|
| 5,464,293 A * | 11/1995 | Hall | A47B 21/045 400/718 |
| 7,652,873 B2 | 1/2010 | Lee | |
| 9,395,905 B2 | 7/2016 | Wherry | |
| 9,773,428 B2 | 9/2017 | Carney et al. | |
| 10,043,408 B2 | 8/2018 | Choppla | |
| 10,108,335 B2 | 10/2018 | Isted et al. | |
| 10,203,786 B1 | 2/2019 | Hsu et al. | |
| 10,424,214 B2 | 9/2019 | Robichuad | |
| 2005/0106538 A1 | 5/2005 | Freeman et al. | |
| 2018/0277014 A1 | 9/2018 | Casella et al. | |

FOREIGN PATENT DOCUMENTS

JP     2019039971     3/2019

\* cited by examiner

*Primary Examiner* — James B Hull

(57) ABSTRACT

A device for learning or teaching computer programming and, more specifically, the steps of executing consecutive computer source lines. The device includes an enclosure containing a source code panel having printed lines of source code visible through a first window in the enclosure and a see-through coding line bar movable across the source code panel to draw the user's attention to each consecutive line of source code being examined. A user-operable control is mounted in the device and is connected to the coding line bar such that movement of the user-operable control mechanically moves the coding line bar across the source code panel to sequentially highlight each consecutive line of code. A comment member and/or a console panel displaying comments and/or output relative to the specific line of code being examined may be movably mounted within the enclosure and be visible through a respective window in the enclosure.

20 Claims, 14 Drawing Sheets

DEVICE FOR LEARNING OR TEACHING COMPUTER PROGRAMMING

CROSS-REFERENCE TO RELATED APPLICATION

This application claims the benefit of U.S. Provisional Patent Application No. 63/119,937, filed on Dec. 1, 2020, which is incorporated herein by reference in its entirety.

FIELD OF THE INVENTION

The present invention relates generally to computer program teaching and learning methods and devices, and more particularly, to a mechanically-operated device and method of operation thereof for teaching and learning computer programming and source code principles.

BACKGROUND OF THE INVENTION

Learning computer programming and the principles of source code can be a difficult and daunting task, particularly for children. To help with learning computer programming, many books, videos and similar readable or viewable sources of information are available in the market. In addition, portable electronic devices have become particularly popular, and many electronic devices have become available to fill this need, either by allowing the learner to access online information or by running software applications that allow the electronic device to serve as a computer programming teaching tool.

Unfortunately, like all electronic devices, electronic computer programming teaching devices include a screen that puts out harmful emissions which may damage a child's eyesight. Further, being electronic devices run by computer programs themselves, they may include various error messages, crashes, viruses, bugs and defective programming, the very issues the devices are being used to teach to prevent. Additionally, like all electronic devices, these devices are limited to the duration of their battery systems before they become inoperable.

Moreover, most electronic computer programming teaching devices are also "open ended" in that they do not include or complete the lesson with a specific result or answer, often leaving the student to have to look elsewhere for a complete explanation of the lessons being presented.

Accordingly, there is need for a solution to at least one of the aforementioned problems. Particularly, considering that children spend an increasing amount of time on their electronic devices, there is a growing need for non-electronic learning systems, devices and methods, and more particularly, for learning systems, devices and methods which contribute to reduce children's screen time (i.e. time a child spends staring into an electronic screen on a daily basis).

SUMMARY OF THE INVENTION

The present invention is directed to a device for teaching and learning computer programming and, more specifically, the steps of coding within computer programming. While embodiments of the device could include electronic screens if required for whatever purpose, preferred embodiments of the device are screenless, and may be non-electronic and essentially mechanical, contributing not to increase the user's total screen time. The device is, therefore, safe for a child to use. Furthermore, the device is closed ended and provides the user with a complete description of a line of code being examined and its final result within the program being taught.

The device includes an enclosure containing a source code panel having printed lines of source code visible through a first window in the enclosure and a transparent coding line bar movable across the source code panel to draw the user's attention to the particular line of source code being taught or examined. A control wheel or other user-operable control is mounted in the device and is connected to the coding line bar by gears such that movement of the control wheel or other user-operable control mechanically moves the coding line bar across the source code panel. A comment member displaying comments relative to the specific line of code being examined is movably mounted within the enclosure and is visible through a second window in the enclosure. An output member is provided and is visible through a third window to display the output of the computer program and a plurality of pullout tabs with additional information are provided in the enclosure. A pointer is provided to identify a specific pullout tab with a specific line of printed source code. The movement of the comment member, the output member and the pointer being mechanically coordinated with the movement of the control lever.

In a first implementation of the invention, a device for teaching or learning computer programming is provided, the device comprising:

- an enclosure defining a first window and a second window;
- a source code panel provided within the enclosure and visible through the first window, the source code panel having printed lines of computer code on a surface of the source code panel;
- a physical coding line bar movably mounted within the enclosure and translatable across the surface of the source code panel to identify specific lines of code printed on the source code panel;
- a user-operable control mechanically connected to the coding line bar such that operation of the user-operable control translates the coding line bar across the surface of the source code panel; and
- a comment member movably mounted within the enclosure and having visible comments corresponding to the printed lines of computer code, the comment member being mechanically connected to the user-operable control such that movement of the user-operable control moves the comment member within the second window, wherein the movement of the comment member within the second window is mechanically coordinated with the movement of the coding line bar across the source code panel.

In a second aspect, the device may further include a control mechanism for transferring movement of the user-operable control to the coding line bar, the control mechanism including an elongate first worm screw rotatably supported in the enclosure, a bevel gear affixed to the user-operable control and in engagement with the first worm screw and a connector clip affixed to the coding line bar and in engagement with the first worm screw.

In another aspect, the user-operable control may be a control wheel rotatably mounted to the enclosure, wherein the control mechanism may convert rotational movement of the control wheel into linear translational movement of the coding line bar.

In another aspect, the control mechanism may include an extension spring connected to the connector clip to bias the coding line bar to a first position.

In another aspect, the enclosure may include a raised divider having tabs on one side of the raised divider and a guide at one end of the raised divided such that movement of the connector clip is paused by the tabs on the raised divider.

In another aspect, the comment member may be mounted on a comment shaft rotatably mounted in the enclosure, the shaft being in engagement with the first worm screw.

In another embodiment, the device may further include an output member rotatably mounted on a console shaft in the enclosure and visible through a third window in the enclosure.

In another embodiment, the comment shaft and the console shaft may be interconnected by a cam assembly.

In another embodiment, the device may further include a plurality of pullout tabs.

In another embodiment, the device may further include a pointer movably mounted in the enclosure and connected to the first worm screw by a second worm screw such that movement of the coding line bar across the source code panel moves the pointer across the plurality of pullout tabs.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a device and method for learning computer programming. As will be described, some preferred embodiments of the invention may be non-electronic, and essentially mechanical in nature.

Figure 1:
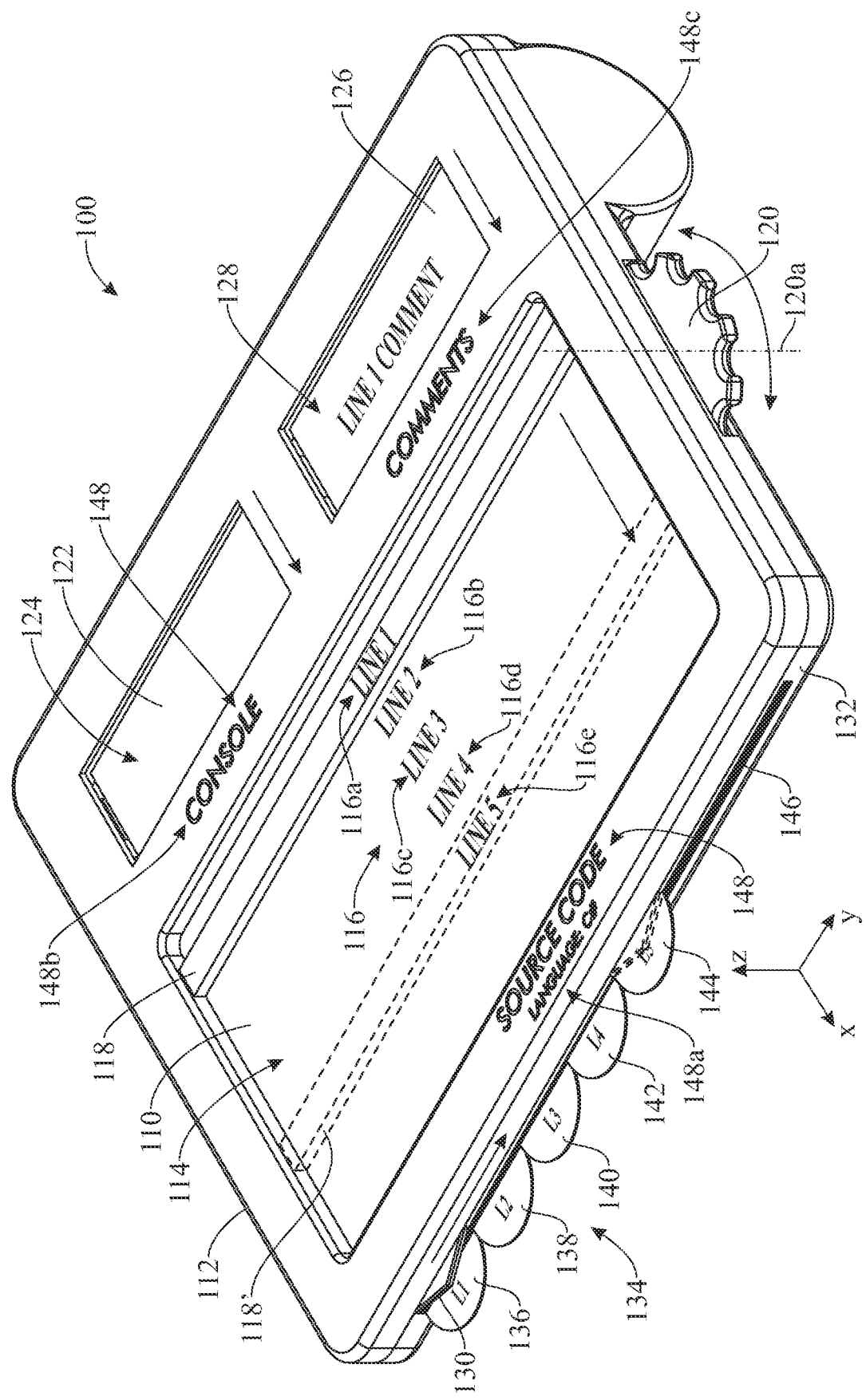
FIG. 1 presents a top, front isometric view of a device for teaching and learning computer programming in accordance with a first illustrative embodiment of the present invention.
Figure 2:
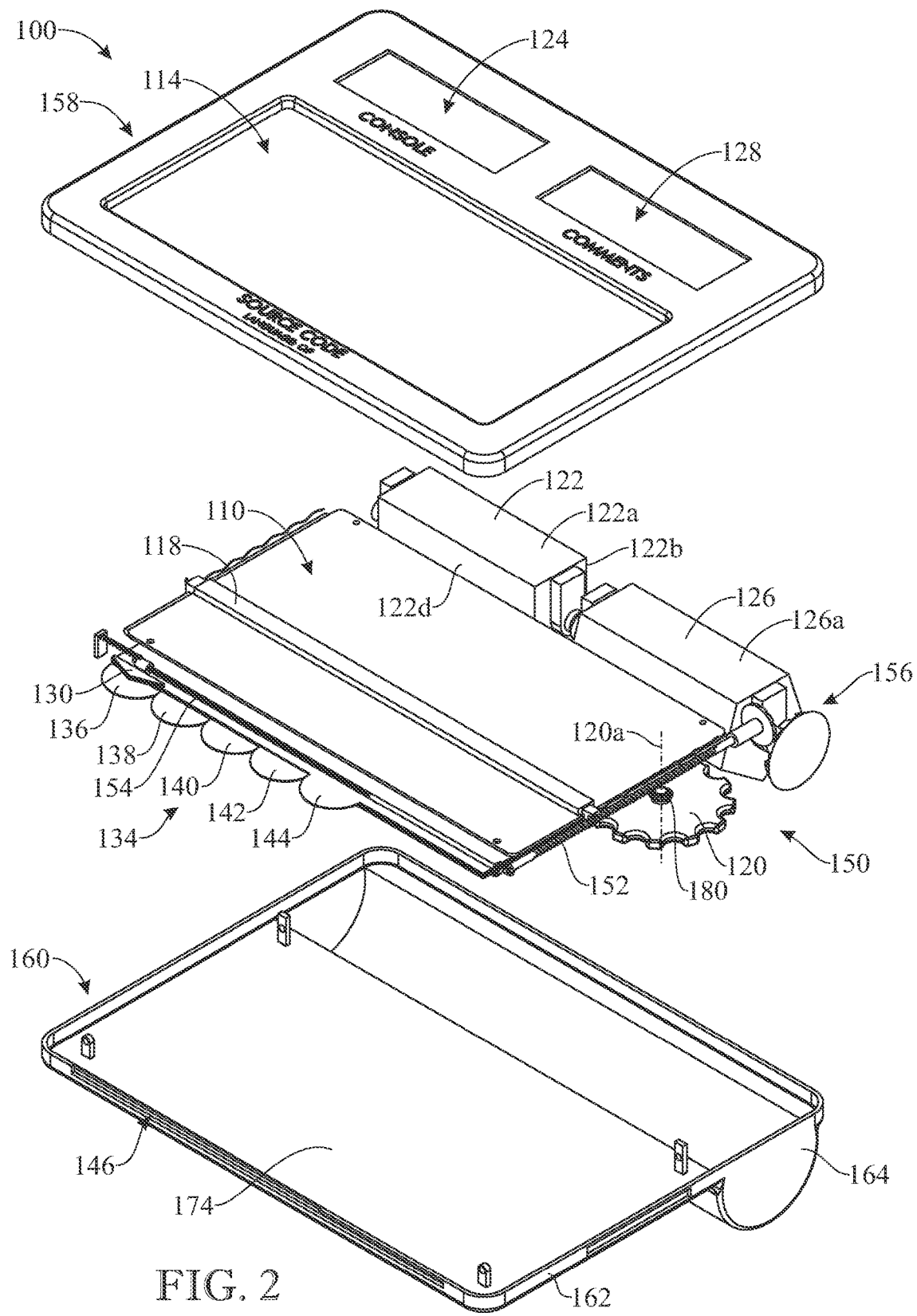
FIG. 2 presents an exploded top front isometric view of the device of FIG. 1.
Figure 3:
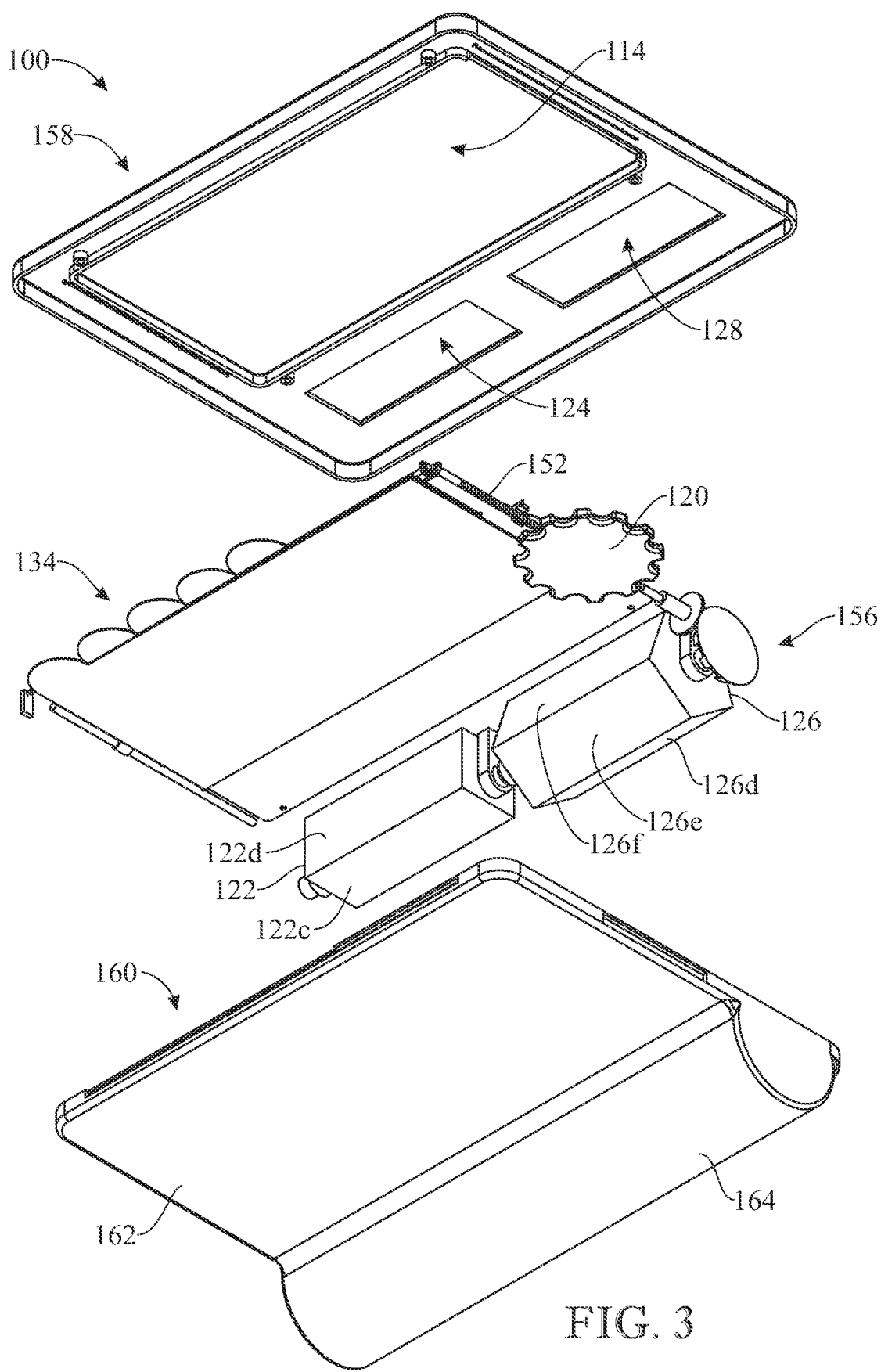
FIG. 3 presents an exploded bottom front isometric view of device of FIG. 1.

Referring to FIGS. 1-3, and initially with regard to FIG. 1, a device for learning and teaching computer programming, hereinafter referred to as device 100, is illustrated in accordance with an exemplary embodiment of the present invention. The device 100 is provided to instruct people, such as, but not limited to, children or senior adults, in the art of computer programming by illustrating and simultaneously explaining source code purpose and execution one line at a time, as in real life computer program and program execution. The device 100 generally includes a source code panel 110 contained within a main body, housing or enclosure 112, and visible through a first window 114 formed in the enclosure 112. The source code panel 110 is provided as a generally flat, solid body or plate, which may be opaque in some embodiments, and includes visible and readable lines of computer code 116 for examination one line at a time. The lines of computer code 116 are provided one beneath the other forming a column in a longitudinal direction x, with each line of computer code 116 extending transversely, i.e. along a transverse direction y generally perpendicular to the longitudinal direction x. The lines of computer code 116 may be formed or provided on the source code panel 110 by techniques such as, but not limited to, printing, stamping, serigraph printing, engraving, manual painting or drawing, or the like. The device 100 further includes a movable, see-through coding line bar 118 which is selectively operable to move over and along the lines of computer code 116 for purposes that will be hereinafter described, responsively to user operation of user-operable controls comprised in the device 100, which will be described in detail hereinafter. For example, the line bar 118 is shown in a first or top position, and in a second or bottom position depicted in broken lines and indicated with reference numeral 118'. In some embodiments, the coding line bar 118 may be formed as a generally flat, elongated, straight strip configured to position over a straight line of alphanumeric text (a line of computer code on the source code panel 110). In different embodiments, the see-through coding line bar 118 may be transparent, translucent, or combinations thereof; for instance, the coding line bar 118 may be entirely transparent, entirely translucent, or may have one or more transparent areas and one or more translucent areas. In different embodiments, the coding line bar 118 may be clear, colored, or a combination of clear and colored. Alternatively or additionally, the coding line bar 118 may include markings, textures, other visible indicia, or combinations thereof. As the coding line bar 118 is moved over and along the lines of computer code 116, the coding line bar 118 sequentially highlights each particular line of code 116 for examination. For example, in FIG. 1, the coding line bar 118 in the first position is positioned over line of code 116a representing a first line of code of an illustrative computer program comprising five lines of code 116a, 116b, 116c, 116d and 116e. A user-operable control, such as, but not limited to, a control wheel 120, is movably mounted to the enclosure 112 and is operable to move the coding line bar 118 over the lines of code 116.

The device 100 additionally includes an output member 122 mounted within the enclosure 112 and visible through a second window 124 formed in the enclosure 112. The output member 122 is configured to display a visible output equivalent to, or resembling, what would be the output generated by the lines of code representing the program, construct and/or algorithm being examined. For instance, in a non-limiting example, the lines of code 116 may correspond with C# programming language; the fifth line 116e may, for instance, consist in "Console.WriteLine("Hello World!");", in which case the output member 122 may show the text "Hello World!" on a face of the output member 122 which is visible when the coding line bar 118 is arranged over the fifth line of code 116e. The output member 122 of the present embodiment is rotatable, and is also rotated by the control wheel 120 as described in more detail hereinbelow to change the visible output provided on the output member 122 as the user navigates the illustrative source code shown in the first window 114.

The device 100 further includes a comment member 126 which is visible through a third window 128 formed in the enclosure 112. The comment member 126 of the present embodiment is formed as a rotatable body, which rotates in conjunction with the movement of the coding line bar 118, to provide a description and explanation of the line of source code 116 highlighted by the coding line bar 118 in order to teach the user the purpose and function of the highlighted line of source code 116 (similarly to program source comments in real life software programs). The comment member 126 is also operated by the control wheel 120, as will be described in detail hereinafter, so that the output member 122, comment member 126 and coding line bar 118 move in sync with each another, responsively to user operation of the device 100 to "step" to a next line of code.

With continued reference to FIG. 1, the device 100 may further include a movable pointer 130 which may extend through a bottom edge 132 of the enclosure 112 and may be provided to pass over and selectively point to, or identify, a series or plurality of extractable or pullout sheets, panels or tabs 134 also extending through the bottom edge 132 of the enclosure 112. The movement of the pointer 130 relative to the plurality of pullout tabs 134 is also controlled by operation of the control wheel 120. Each of the plurality of pullout tabs 134 may contain information on a respective line of code 116. Examples of such information may include, but are not limited to, an explanation of the software instruction comprised in the line of code, details regarding the different variables or input parameters used/usable with the software instruction, etc. For example, the plurality of pullout tabs 134 may include first, second, third, fourth and fifth pullout tabs 136, 138, 140, 142 and 144 which correspond to lines of code 116a, 116b, 116c, 116d and 116e, respectively. The movement of the pointer 130 is also coordinated with the movement of the coding line bar 118 such that the pointer 130 is positioned over and identifies the specific pullout tab of the plurality of pullout tabs 134 containing more information on the particular line of code 116 being examined (i.e., the particular line of code 116 that is highlighted by the coding line bar 118 being arranged directly over said particular line of code 116). The pointer 130 and the pullout tabs 134 extend through and out of a slot 146 defined in the bottom edge 132 of the enclosure 112.

As further shown in FIG. 1, indicia 148 may be provided on the enclosure 112 to describe various elements of the device 100. For example, indicia 148a may be provided to describe the type of source code or programming language being taught by the device 100, while other indicia, such as, but not limited to, indicia 148b and indicia 148c, may identify the purpose or nature of the contents being displayed through the second and third windows 124 and 128, respectively.

Figure 4:
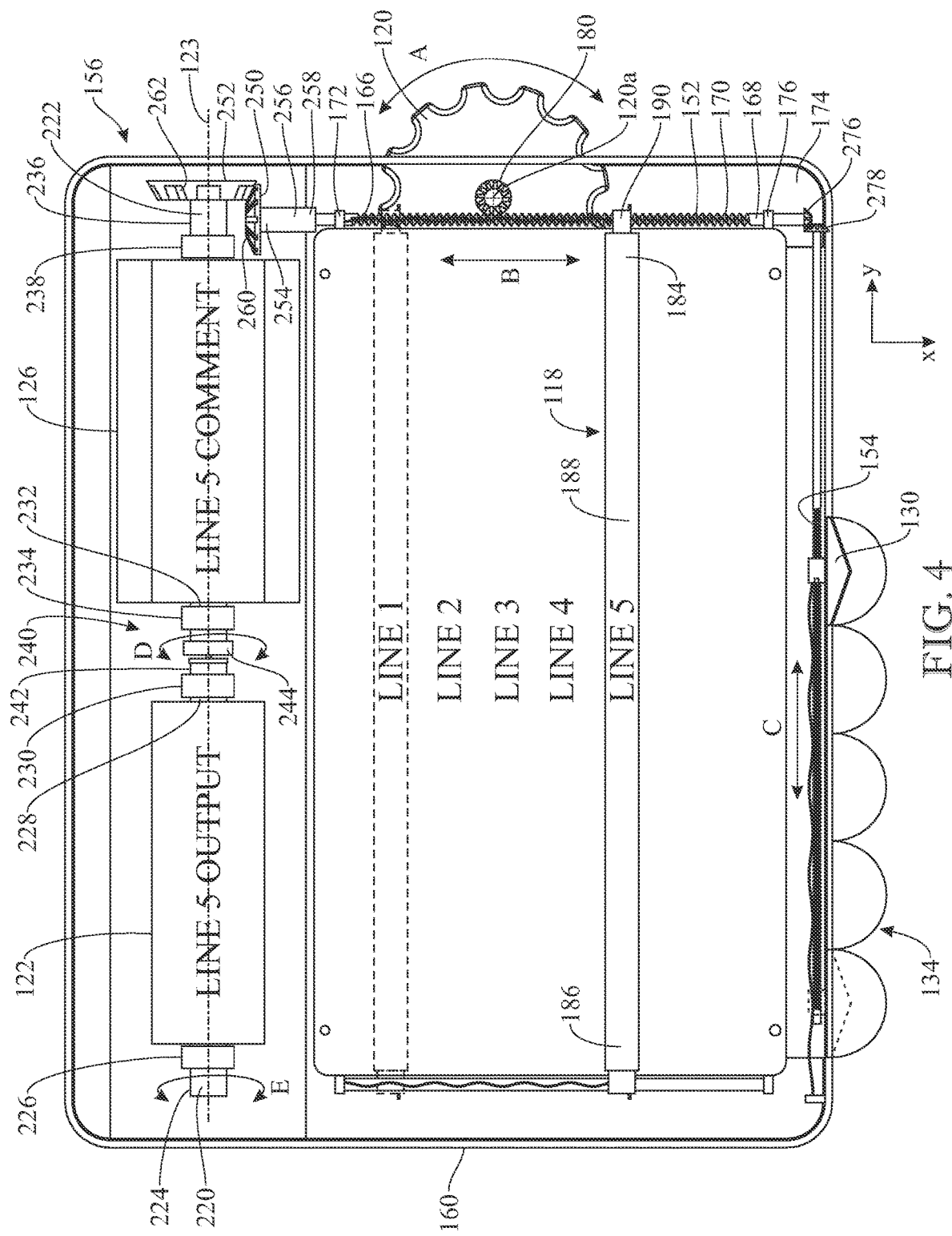
FIG. 4 presents a top plan view of the device of FIG. 1.

Turning now to FIGS. 2-4, the device 100 contains a control mechanism 150 which operates to move the coding line bar 118, the output member 122, the comment member 126, and the pointer 130, responsively to user operation or movement of the control wheel 120. The control mechanism 150 is configured to convert user operation of the user-operable control to a linear movement of the coding line bar 118 along the longitudinal direction x, a linear movement of the pointer 130 along the transverse direction y, and a rotational movement of the output member 122 and comment member 126. In a non-limiting example, the control mechanism 150 may include a rotatable, bar worm screw or first worm screw 152 which interacts with the control wheel 120 to move the coding line bar 118 in the longitudinal direction x, from one line of code 116 to the next. The control mechanism 150 additionally includes a rotatable, tab worm screw or second worm screw 154 which interacts with the rotation of the first worm screw 152 to move the pointer 130 across and over the pullout tabs 134 along the transverse direction y. The control mechanism 150 further includes a rotation mechanism 156 which also interacts with the rotation of the first worm screw 152 to selectively rotate the output member 122 and the comment member 126 in response to rotation of the control wheel 120 as described in more detail herein below.

As best shown in FIGS. 2 and 3, the enclosure 112 includes an enclosure top 158 and an enclosure bottom 160. The enclosure top 158 of the present embodiment is formed as a generally solid cover, in which the first, second and third windows 114, 124 and 128, respectively, are formed. The enclosure bottom 160 of the present embodiment is also formed as a generally solid cover. The depicted enclosure bottom 160 includes a flat, front code retaining portion 162 supporting the source code panel 110 and a rear trough portion 164 for supporting and containing the output member 122, the comment member 126 and the rotation mechanism 156 operating the output member 122 and the comment member 126.

In a particular embodiment, the output member 122 may be an elongated and rectangular body or block having four flat faces 122*a*, 122*b*, 122*c* and 122*d*. At least one of the four flat faces 122*a-d* displays an output that would be provided in real life operation by a computer instruction as provided in the specific, highlighted line of code of the plurality of lines of code 116. The comment member 126, in turn, may be an elongated and pentagonal body or block having five flat faces 126*a*, 126*b*, 126*c*, 126*d* and 126*e*. The five flat faces 126*a-e* may correspond to the five lines of code 116*a-e* displayed on the source code panel 110. Alternative embodiments are contemplated in which the shape of the output member 122 and/or the shape of the comment member 126 may be other than rectangular or pentagonal, respectively. In some embodiments, the output member 122 and comment member 126 may have a same number of faces; in some embodiments, said number may match the number of lines of code 116 provided in the source code panel 110.

With continued reference to FIGS. 2 and 3, the bottom enclosure 160 is attachable to the top enclosure 158. In some embodiments, the bottom and top enclosures 160 and 158 and may be permanently affixed to one another by methods such as, but not limited to, gluing, welding, riveting or other fastener connections. In other embodiments, the bottom and top enclosures 160 and 158 may be disconnectably attached to one another by methods such as, but not limited to, a friction fitting, a snap fitting, or a sliding connection, to allow the user or operator to change the source code panel 110 to change the type of computer program and lines of source code 116 being examined. The enclosure 112 may be formed from a variety of materials or combinations thereof, which may include, but not limited to, plastics or other polymers, metallic materials, and even organic materials such as, but not limited to, various types of wood to be safer and more attractive to younger users.

Referring to FIGS. 4-8, the control mechanism 150 and the rotation mechanism 156 will now be described. As best shown in FIG. 4, rotation of the control wheel 120 in the direction of arrow "A" (i.e. about a vertical, control wheel rotation axis 120*a*) rotates the first worm screw 152 to move the coding line bar 118 in the direction of arrow "B" (i.e. along the longitudinal direction x) across the lines of code 116. As noted above, the rotation of the first worm screw 152 rotates the second worm screw 154 such that rotation of the control wheel 120 moves the pointer 130 in the direction of arrow "C" (i.e. in the transverse direction y) over the pullout tabs 134. Likewise, and as noted hereinabove, rotation of the first worm screw 152 additionally operates the rotation mechanism 156 to rotate the output member 122 and the comment member 126 in respective directions indicated schematically by arrows "E" and "D", respectively, and about a common rotation axis 123 arranged in the transverse direction y.

Figure 5:
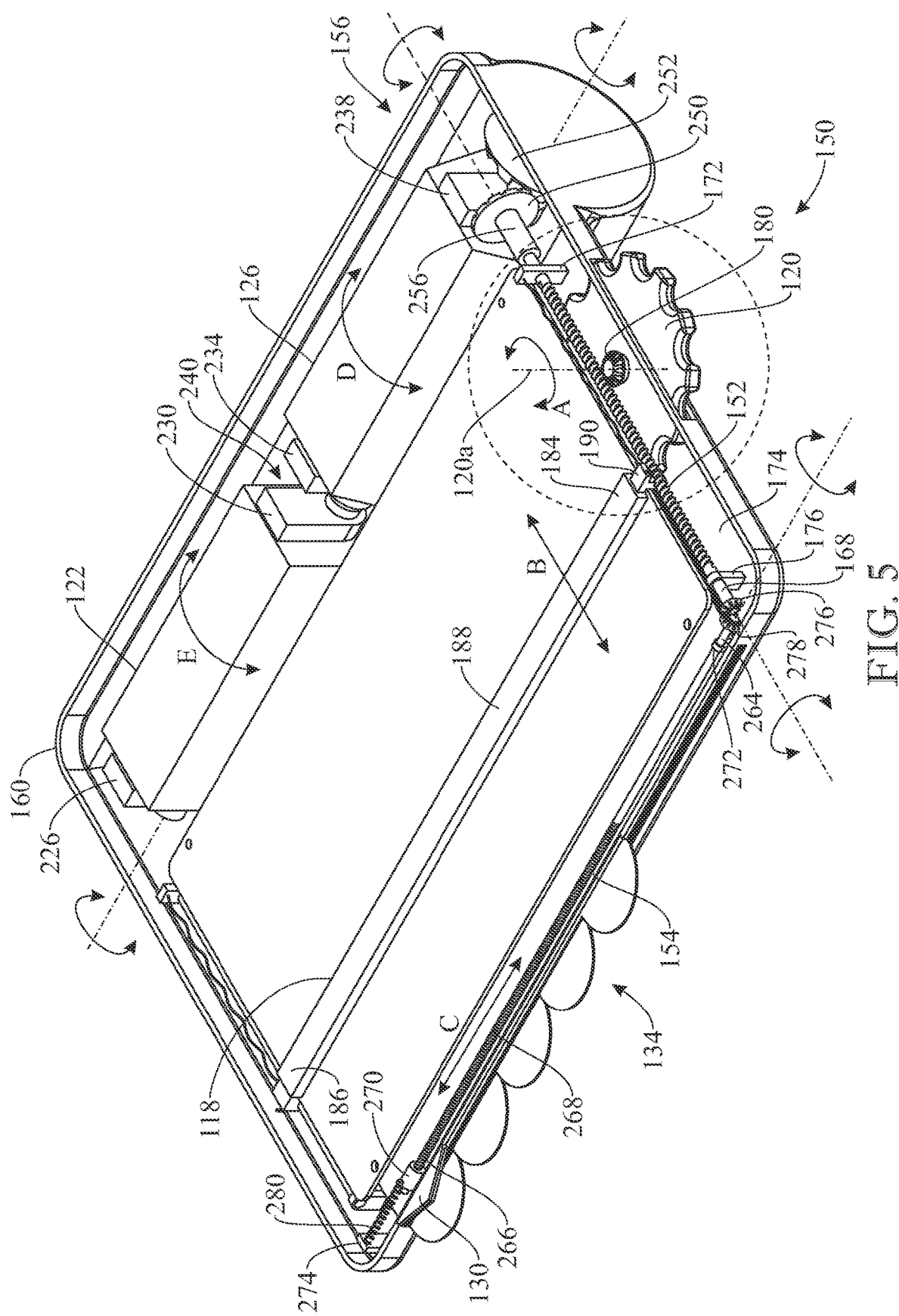
FIG. 5 presents a top, front isometric view of the of FIG. 1 with a top cover of the enclosure removed to reveal internal parts and components.

Referring to FIGS. 4 and 5, the first worm screw 152 has a first end 166, an opposite second end 168 and a helical thread 170 intermediate the first and second ends 166 and 168, respectively. The first end 166 of the first worm screw 152 is rotatably supported by a first end support 172 extending upwardly from an inner surface 174 of the flat front code retaining portion 162 of the enclosure bottom 160, and the second end 168 of the first worm screw 152 is rotatably supported on a second end support 176 also extending upwardly from the inner surface 174 of the flat front code retaining portion 162 of the enclosure bottom 160. The control mechanism 150 includes a bevel gear or worm gear 180 extending from and jointly rotatable with the control wheel 120 about the control wheel rotation axis 120*a*; the worm gear 180 is operatively engaged with the first worm screw 152 to rotate the first worm screw 152 in response to rotation of the control wheel 120.

Figure 6:
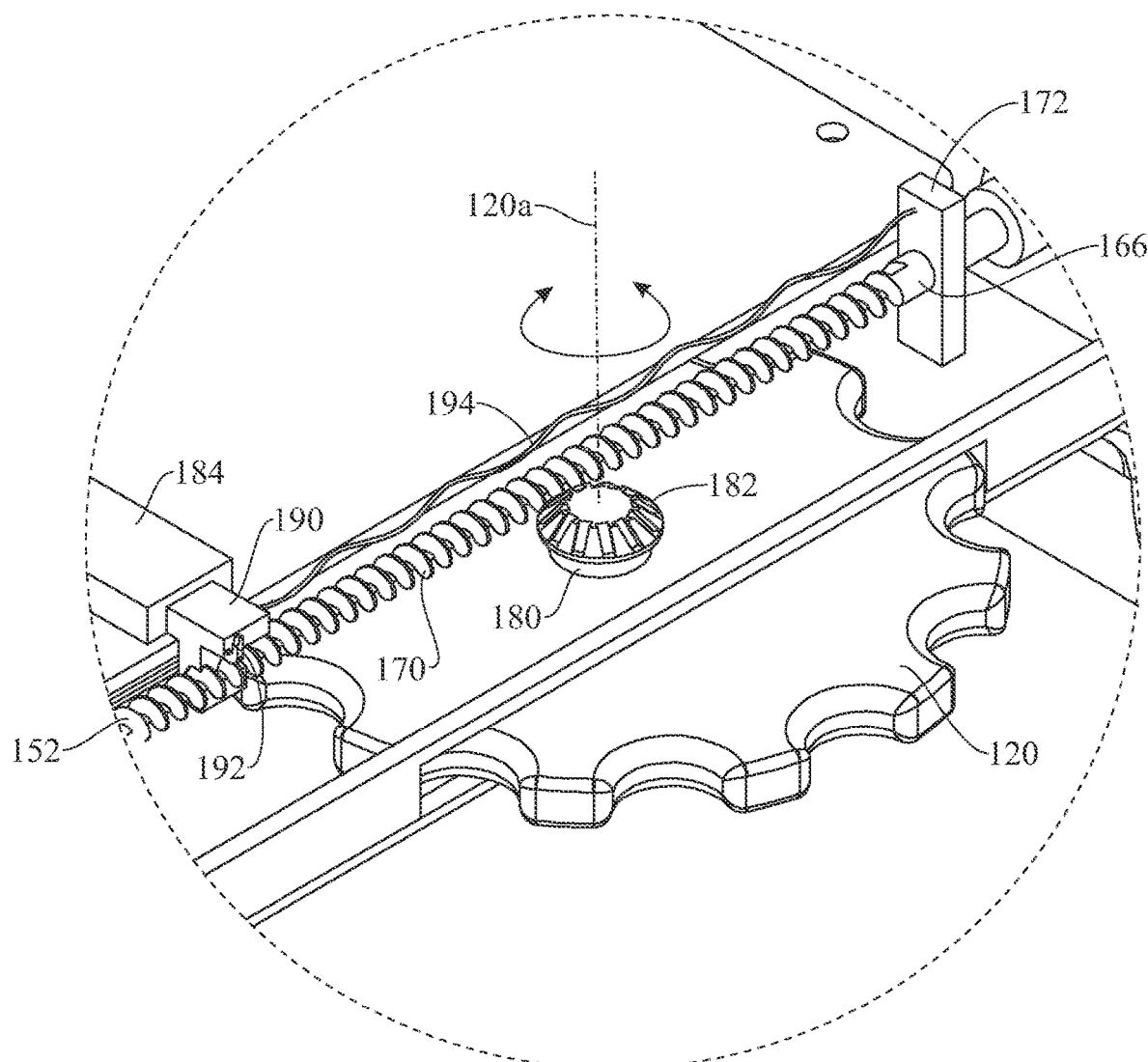
FIG. 6 presents an enlarged area of detail view of FIG. 5 illustrating a control wheel and worm drive of the device of FIG. 1.

Specifically, as best shown in FIG. 6, teeth 182 formed on the worm gear 180 engage and interact with the helical thread 170 on the first worm screw 152 to form a worm drive which configured to rotate the first worm screw 152 in response to rotation of the control wheel 120 and thus the worm gear 180. When the control wheel 120 is rotated about the vertical, control wheel rotation axis 120*a*, the worm gear 180 rotates jointly with the control wheel 120 about the same rotation axis, and the rotational movement of the worm gear 180 is converted by said worm drive into a rotational movement of the first worm screw 152 about a central longitudinal axis of the first worm screw 152. As noted hereinabove, rotation of the control wheel 120, and thus rotation of the first worm screw 152, functions to move the transparent coding line bar 118 across the lines of code 116.

As further shown in FIGS. 4 and 5, the coding line bar 118 generally includes a first end 184, a second end 186 and an intermediate section 188, intermediate the first and second ends 184 and 186, respectively. As described heretofore, at least part of the intermediate section 188 is see-through to allow a user to view the line of code 116 arranged below the intermediate section 188. A connector clip 190 is affixed to the first end 184 of the coding line bar 118 and engages the helical thread 170 of the first worm screw 152, the helical thread 170 providing a lead screw such that a rotational movement of the first worm screw 152 about its central longitudinal axis is converted into a longitudinal displacement of the connector clip 190, thereby moving the coding line bar 118 up and down in the longitudinal direction x, as indicated by arrow "B" (FIG. 4), and across the lines of code 116. As shown in FIG. 6, the connector clip 190 may include an extending tab 192 which engages and rides in the helical thread 170 of the first worm screw 152. As further shown in FIG. 6, in some embodiments, an extension spring 194 may extend between, and be affixed to, the first end support 172 on the enclosure 112 and the connector clip 190 on the coding line bar 118 to bias and return the coding line bar 118 to an initial position as described in more detail hereinbelow.

Figure 7:
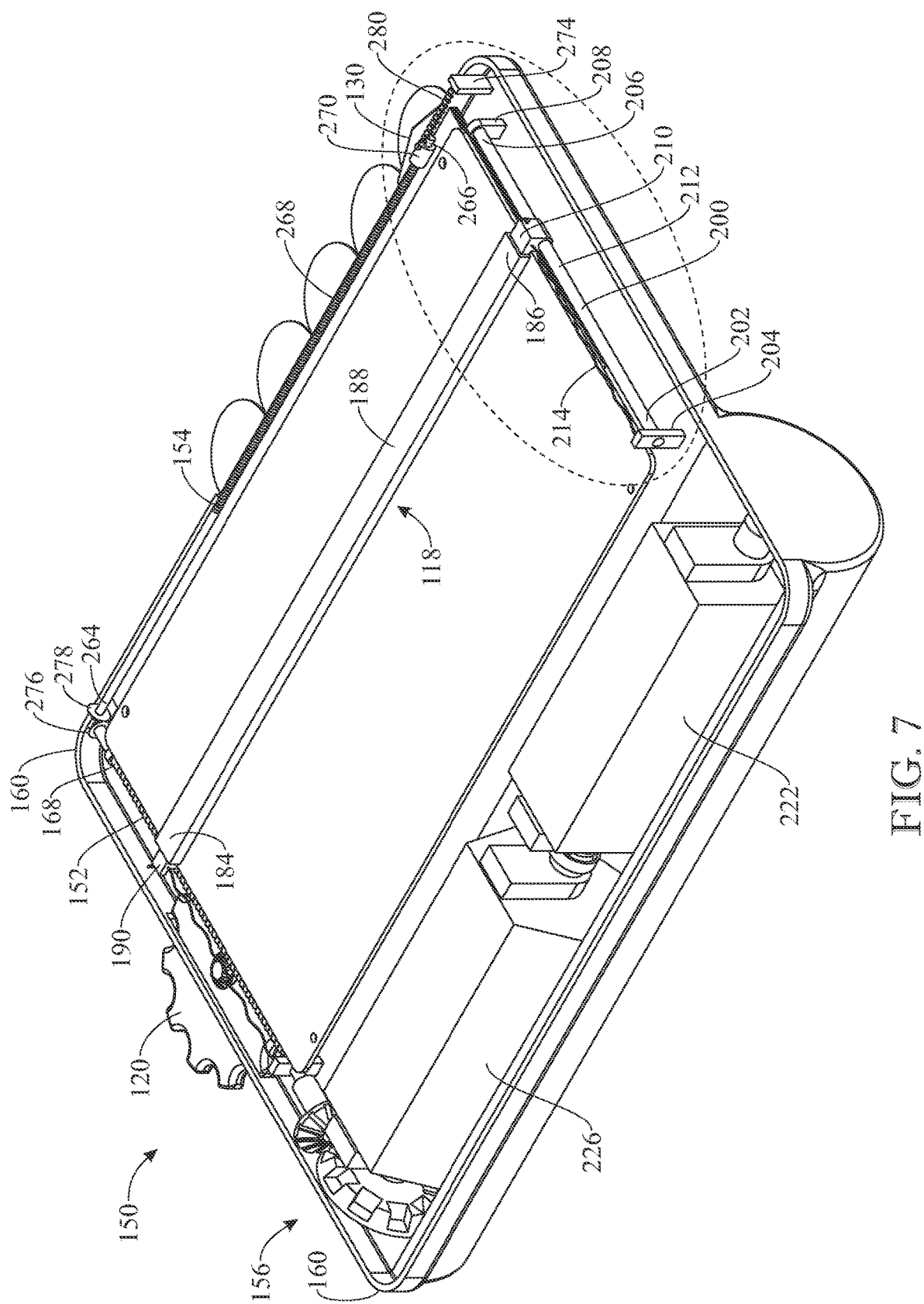
FIG. 7 presents a top, rear isometric view of the device of FIG. 1 with a top cover removed.
Figure 8:
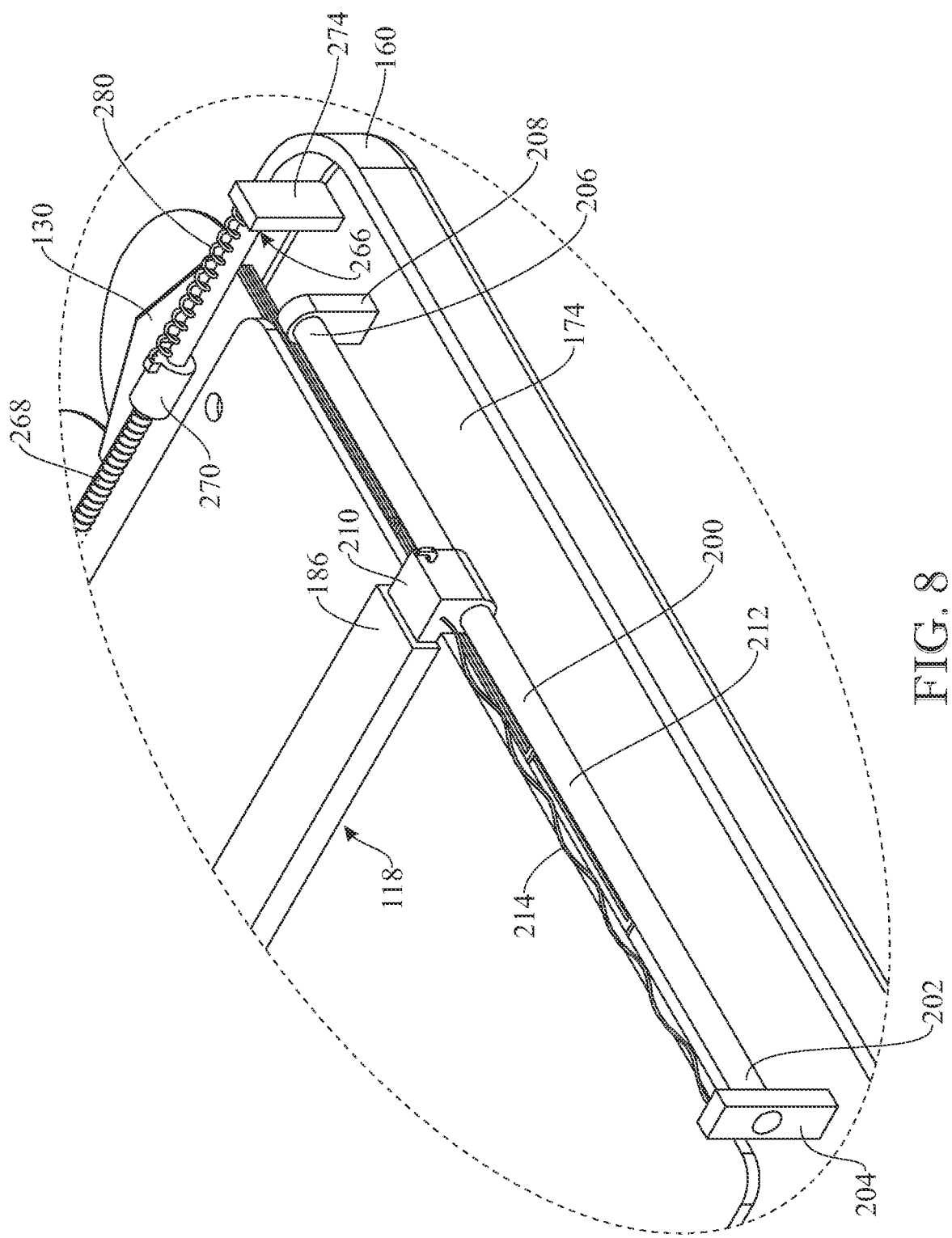
FIG. 8 presents an enlarged area of detail of FIG. 7, illustrating a coding line bar guide rail and extension spring of the device of FIG. 1.

Referring now to FIGS. 7 and 8, the second end 186 of the coding line bar 118 is supported by and freely rides on a guide bar 200 supported on the bottom enclosure 160. For example, the guide bar 200 may include a first end 202 supported on a first guide bar support 204 extending upwardly from the inner surface 174 of the flat front code retaining portion 162 of the bottom enclosure 160 and a second end 206 supported by on a second guide bar support 208 extending upwardly from the flat front code retaining portion 162 of the bottom enclosure 160. A second connector 210 may be provided on the second end 186 of the coding line bar 118 and may freely ride on an intermediate portion 212 of the guide bar 200 to allow the coding line bar 118 to move freely, evenly and in a stabilized manner, across the lines of code 116 on the source code panel 110. A second extension spring 214 may extend between and be affixed to the first guide bar support 204 and the second connector 210 to bias the second connector 210 and thus the second end 186 of the coding line bar 118 longitudinally rearward (i.e. upward along the lines of code 116) to an initial position as described hereinbelow.

Referring again to FIG. 4, the operation of the rotation mechanism 156 to rotate the output member 122 and the comment member 126 will now be described. As shown, the output member 122 is mounted on and affixed to a rotatable first shaft 220 and the comment member 126 is mounted on and affixed to a rotatable second shaft 222. A first end 224 of the first shaft 220 is rotatably supported in a first support 226 extending from the inner surface 174 of the bottom enclosure 160 and a second end 228 of the first shaft 220 is rotatably supported in a second support 230 extending from the inner surface 174 of the bottom enclosure 160. Likewise, a first end 232 of the second shaft 222 is rotatably supported on a first support 234 and a second end 236 of the second shaft 222 is rotatably supported on a second support 238, wherein the first and second supports 234 and 238 may extend from the inner surface 174 of the bottom enclosure 160.

The second end 228 of the first shaft 220 and the first end 232 of the second shaft are interconnected by a cam assembly 240. The cam assembly 240 allows the second shaft 222, and thus the comment member 126, to rotate simultaneously with the rotation of the first worm screw 152 and the control wheel 120 and only engage the rotation of the output member 122 after the last line of code 116 has been examined. The cam assembly 240 includes a first cam 242 affixed to the second end 228 of the first shaft 220 and a second cam 244 affixed to the first end 232 of the second shaft 222.

The rotation mechanism 156 additionally includes a first bevel gear 250 connected to and jointly rotatable with the first worm screw 152 and a second bevel gear 252 connected to and jointly rotatable with the second shaft 222. Specifically, the first bevel gear 250 is affixed to and jointly rotatable with a first end 254 of an extension shaft 256; a second end 258 of the extension shaft 256 is affixed to, or formed integrally with, and jointly rotatable with, the first end 166 of the first worm screw 152. In some embodiments, the first bevel gear 250 may include a larger number of teeth 260 than the number of teeth 262 formed on the second bevel gear 252. This larger ratio of teeth between the first and second bevel gears 250 and 252, respectively, may allow for the longer movement of the coding line bar 118 along the first worm screw 152 relative to the smaller amount of rotation of the second shaft 222 and thus the comment member 126 affixed thereto.

Rotation of the control wheel 120 rotates the first worm screw 152, which in turn rotates the second shaft 222 through the first and second bevel gears 250, 252, respectively. As the second shaft 222 rotates, it rotates the second cam 244 until the second cam 244 engages the first cam 242 to thereby rotate the first shaft 220 and thus the output member 122. As noted above, the engagement of the first and second cams 242 and 244, respectively, is timed to allow the comment member 126 to rotate through all six sides before the second cam 244 engages the first cam 242 to rotate the output member 122 at the end of the last line of code 116e (FIG. 1).

Turning now to FIGS. 5, 7 and 8, and as noted herein above, the pointer 130 rides through the slot 146 (FIG. 1) formed through the bottom edge 132 of the enclosure 112. The pointer 130 is moved transversely through the slot 146 by engagement with the second worm screw 154. The second worm screw 154 includes a first end 264, an opposite second end 266 and a threaded portion 268 intermediate the first and second ends 264 and 266. A connector barrel 270 is mounted on the threaded portion 268 of the second worm screw 154 and is affixed to the pointer 130. The connector barrel 270 includes internal threads (not shown) which ride over and engage the threaded portion 268 of the second worm screw 154 such that rotation of the second worm screw 154 about a central axis thereof moves the connector barrel 270, and thus the pointer 130, in the transverse direction y, along the length of the threaded portion 268 of the first worm screw 154.

The first end 264 of the second worm screw 154 is rotatably supported in a first support 272 and the second end 266 of the second worm screw 154 is connected to a second support 274. A first bevel gear 276 is affixed to the second end 168 of the first worm screw 152 and a second bevel gear 278 is affixed to the first end 264 of the second worm screw 154. The first bevel gear 276 engages the second bevel gear 278 such that rotation of the first worm screw 152 about its central axis (arranged in the longitudinal direction x) rotates the second worm screw 154 about its respective central axis (arranged in the transverse direction y). In some embodiments, the first bevel gear 276 and the second bevel gear 278 may include equal number of teeth such that the pointer 130 moves simultaneously with the movement of the coding line bar 118. An extension spring 280 may be provided and may be affixed between the connector barrel 270 and the second support 274 to bias the connector barrel 270, and thus the pointer 130, back to an initial position, most proximate to the second support 274.

Figure 9:
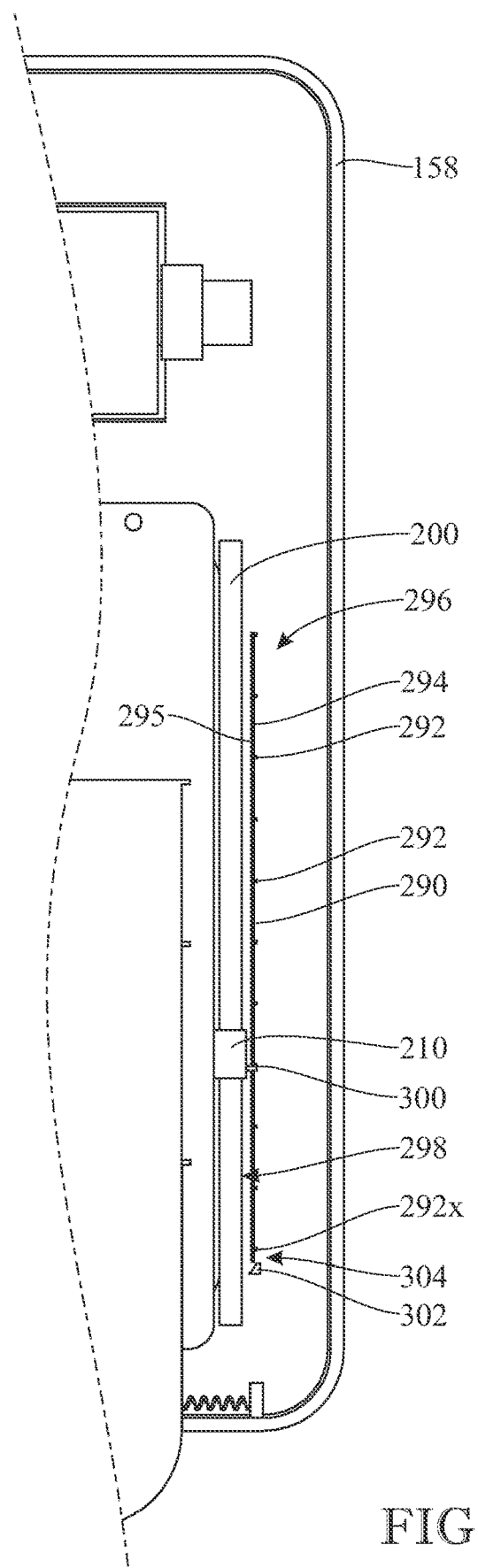
FIG. 9 presents a partial bottom plan view, with the bottom cover removed, of the device of FIG. 1, illustrating a guide channel formed in an underside of the top cover of the device.
Figure 10:
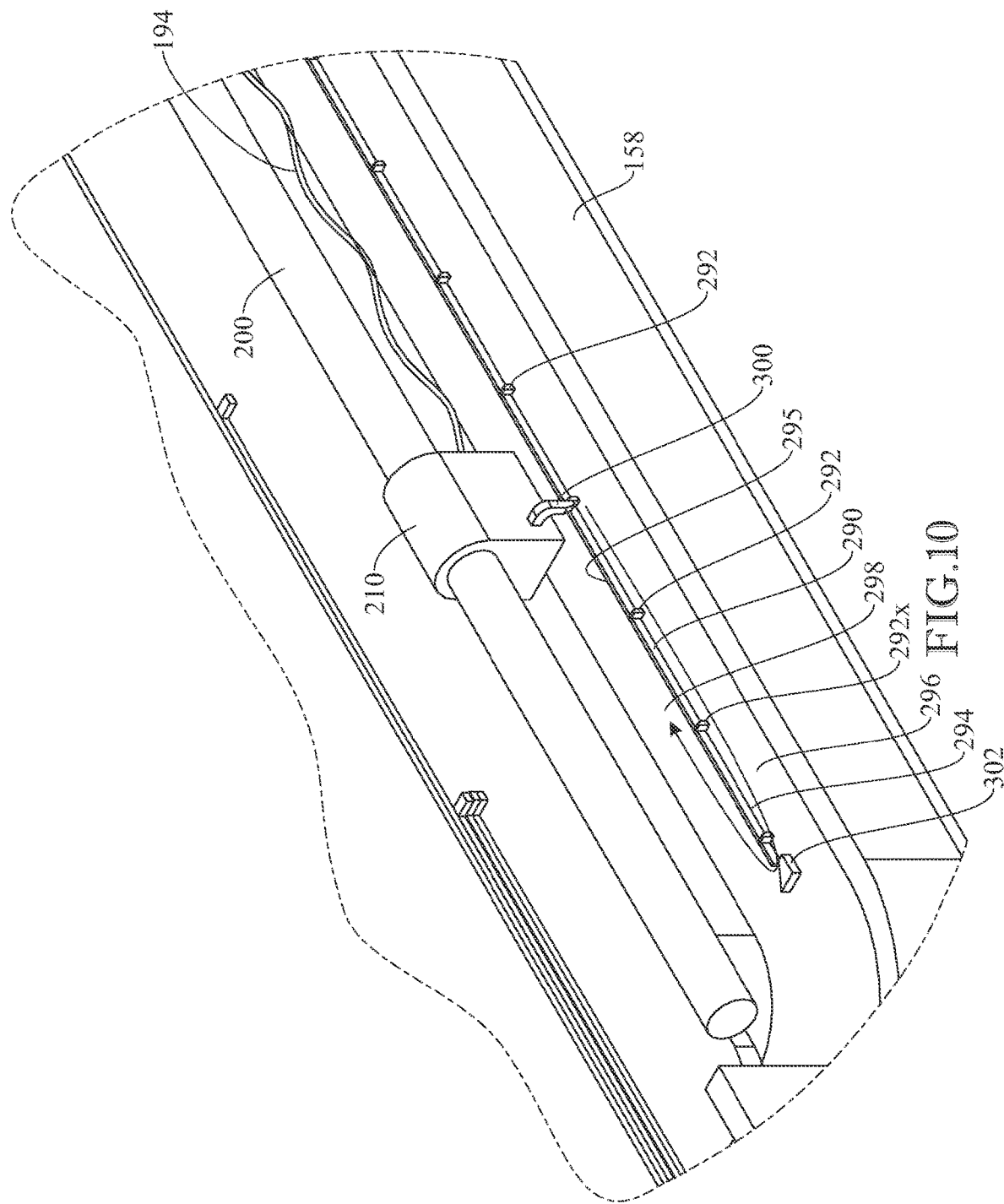
FIG. 10 presents an enlarged view of the guide channel formed in the underside of the top cover of the device of FIG. 1 and the interaction of a worm screw connector clip with the return channel of the top cover.

Referring now to FIGS. 9 and 10, as indicated above, once the coding line bar 118 has been moved to the bottommost position over the last line of code 116e, continued rotation of the control wheel 120 causes the coding line bar 118 to return to the top or initial position over the first line of code 116a. The pointer 130 is also returned to its initial position over the first pullout tab 136. To accomplish this, the enclosure top 158 includes a raised elongate wall or raised divider 290, the raised divider 290 having a plurality of tabs 292 extending transversely outward from an outer or first side 294 of the raised divider 290. The raised divider 290 forms a first channel side 296 on the first side 294 of the raised divider 290 and a second channel side 298 on an inner or second side 295 of the raised divider 290 opposite to the first side 294. The second connector 210 affixed to the coding line bar 118 and in engagement with the guide bar 200 includes a projecting connector tab 300.

In operation, as the second connector 210 is moved downward along the guide bar 200, the connector tab 300 on the second connector 210 sequentially engages individual tabs 292 extending from the first side 294 of the raised divider 290 as it is moved down through the first side channel 296. The tabs 292 on the raised divider 290 are longitudinally spaced from each other to coordinate with the positions of the lines of code 116 and the plurality of pullout tabs 134 such that the second connector 210 stops or pauses at each individual tab 292 and remains there until forced over by the rotation of the control wheel 120. Said discrete stops provided by the tabs 292 allow coding line bar 118 to be locked at discrete longitudinal positions which correspond to the respective positions of the lines of code 116.

After the connector tab 300 engages the last tab 292x, a guide 302 at a first end 304 of the raised divider 290 directs or forces the connector tab 300 to move over from the first channel side 296 to the second channel side 298 of the raised divider 290. Since the second side 295 of the raised divider 290 is devoid of any tabs, the second connector 210 is free to be pulled up the second channel side 298, by the bias of the extension spring 194, to the top or initial position to thereby return the coding line bar 118 to the top of the source code panel 110 and the pointer 130 back over the first pullout tab 136 of the plurality of pullout tabs 134.

Figure 11:
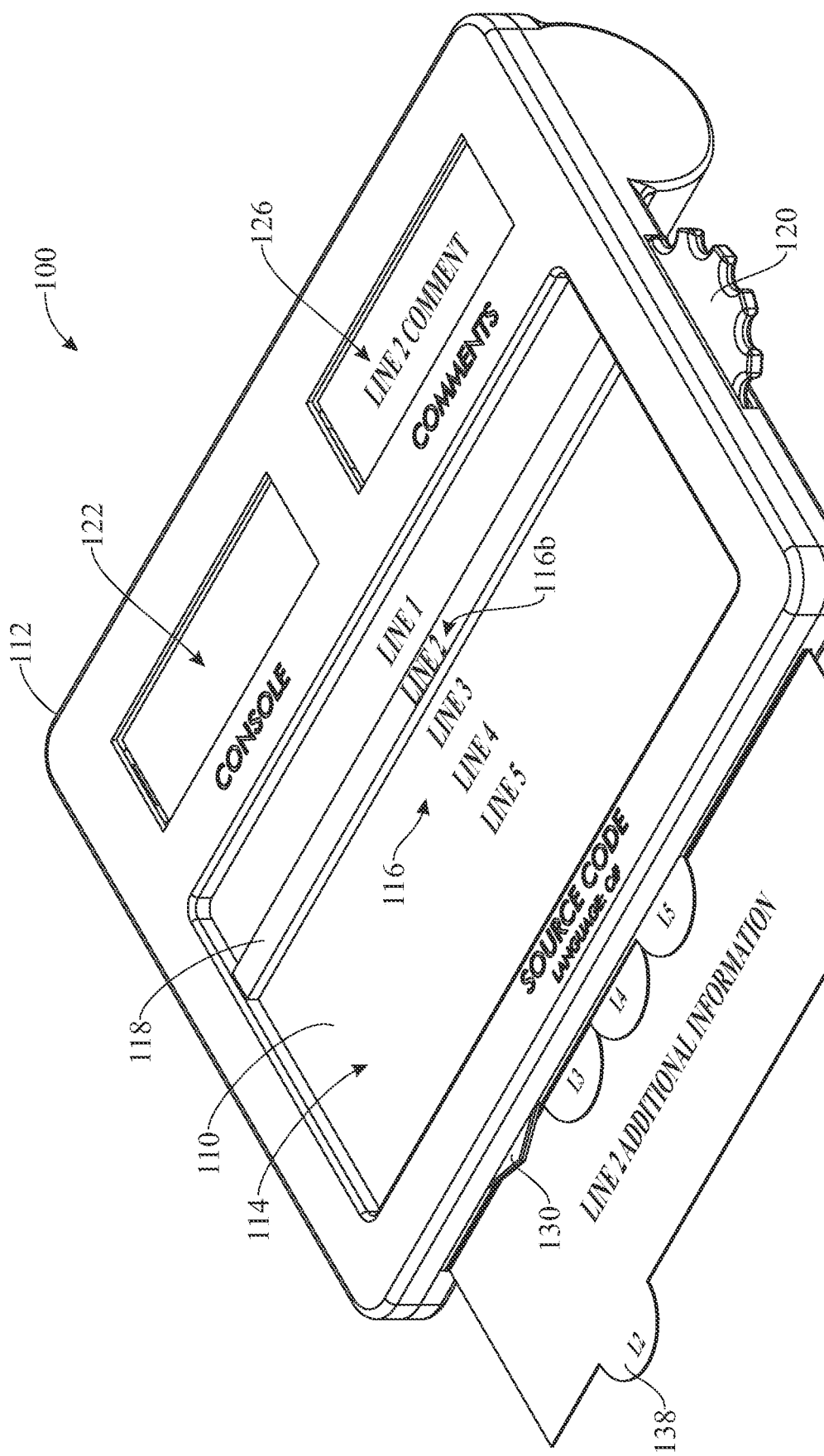
FIG. 11 presents a top, front isometric view of the device of FIG. 1, showing a first pullout tab of a series of pullout tabs pulled out from the enclosure to further display information related to the lines of code shown by the device.

Finally, with reference to FIG. 11 and as noted above, the position of the pointer 130 over the pullout tabs 134 corresponds to the position of the coding line bar 118 over the lines of code 116. For example, as shown when the coding line bar 118 is positioned over the second line of code 116b, the pointer 130 is positioned over the second pullout tab 138 to indicate to the user that the second pullout tab 138 contains more information on the second line of code 116b than is provided on the comment member 126 which, as noted above, is also coordinated with the position of the coding line bar 118. By incrementing the information one segment or line of code 116 at a time with a final and complete output displayed on the output member 122 the device 100 forms a closed end device not leaving the student or other user to fend for themselves to determine what comes next.

Figure 13:
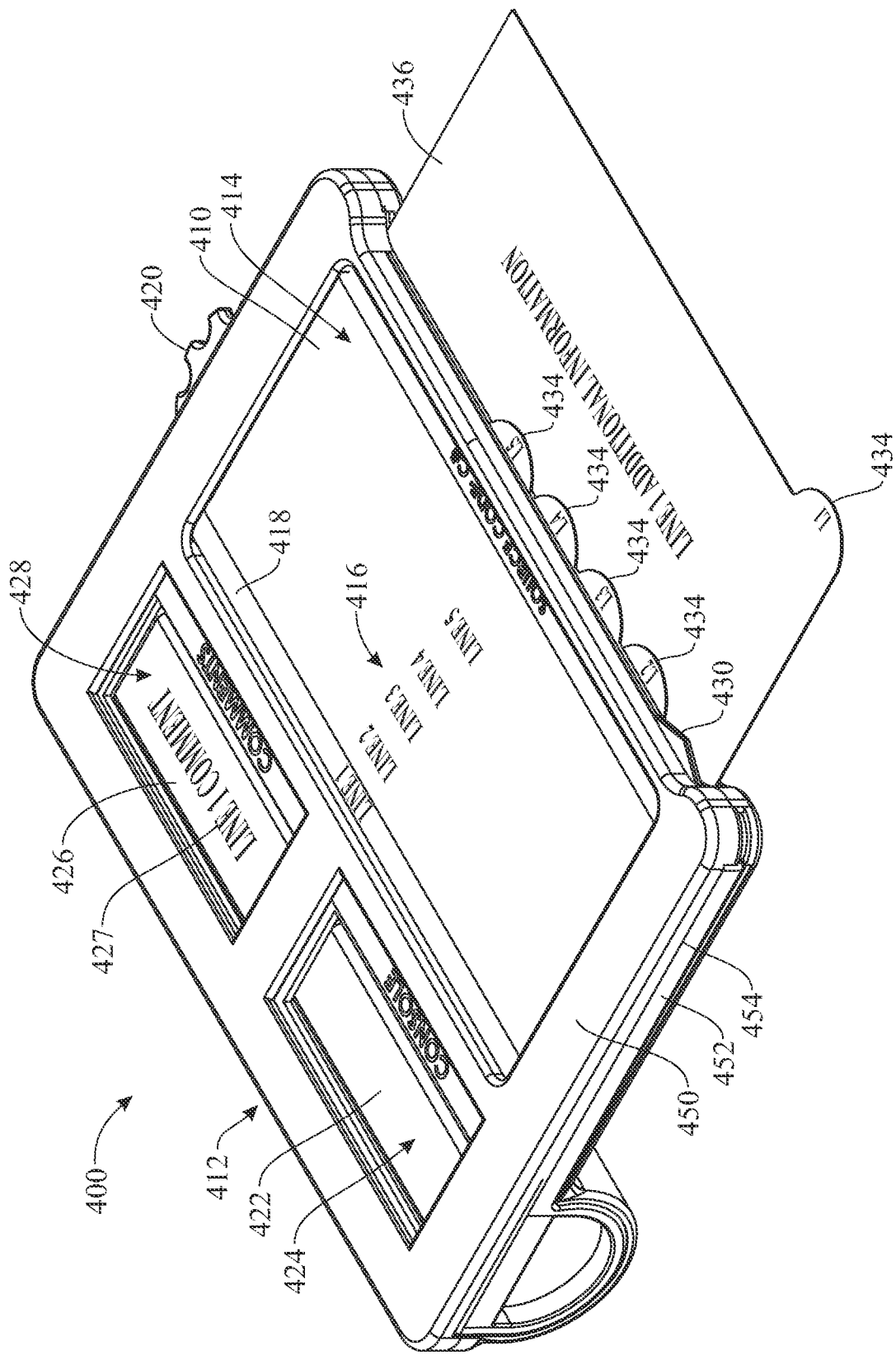
FIG. 13 presents a top, front isometric view similar to FIG. 13, with one extractable panel shown extended from the enclosure.
Figure 14:
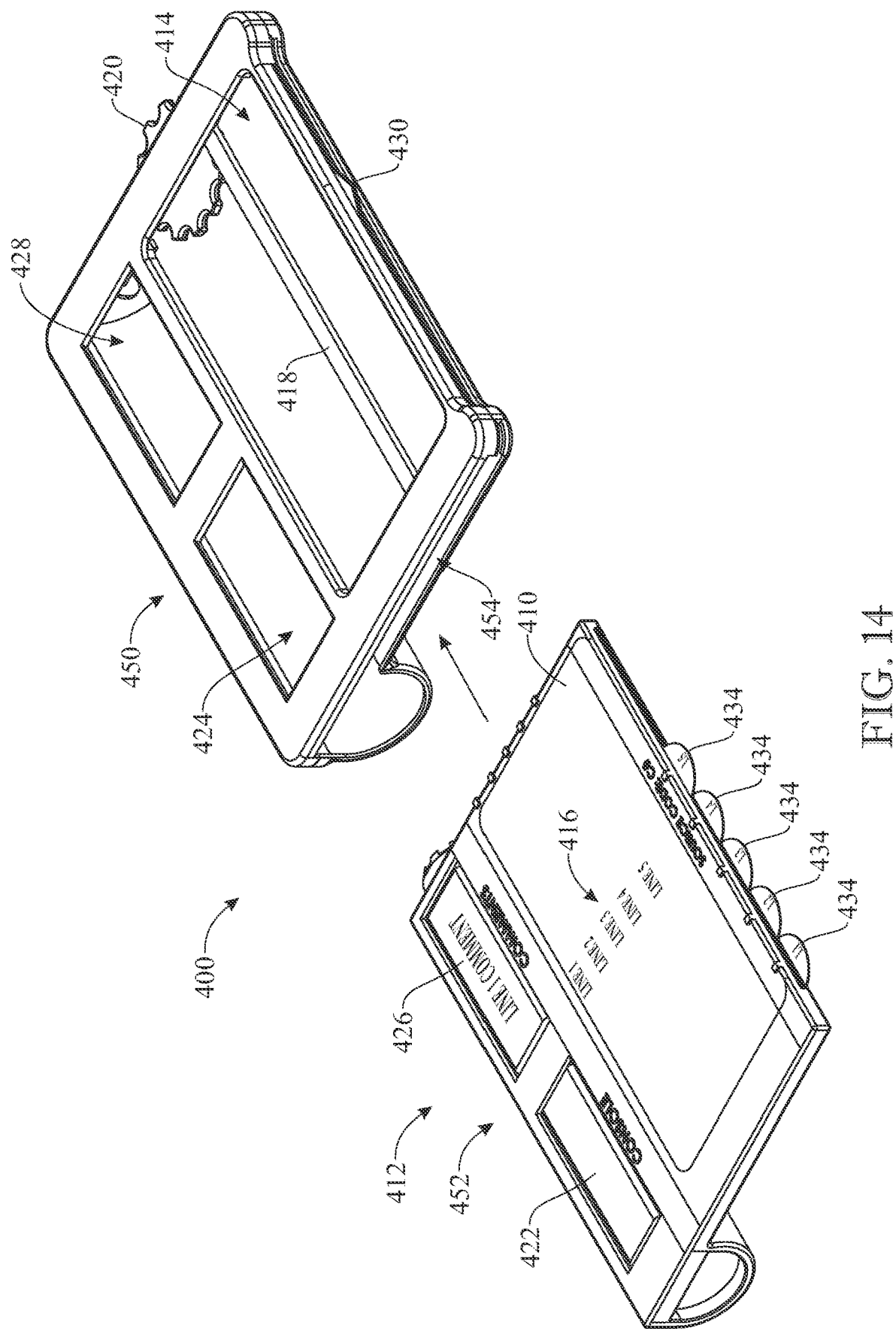
FIG. 14 presents a top, front isometric view of the device of FIG. 12, illustrating a second housing of the enclosure separated from a first housing of the enclosure.

Further embodiments of the invention are contemplated in which the source code panel, comments member and output member may be encapsulated into a single removable cartridge or capsule (e.g., a cylindrical or rectangular capsule), which may be removable from the enclosure and interchangeable with other similar cartridges or capsules in order to vary the source code being examined by the device, and to thereby enhance the computer programming lesson. The illustrations of FIGS. 12-14 show an example of such embodiment.

Figure 12:
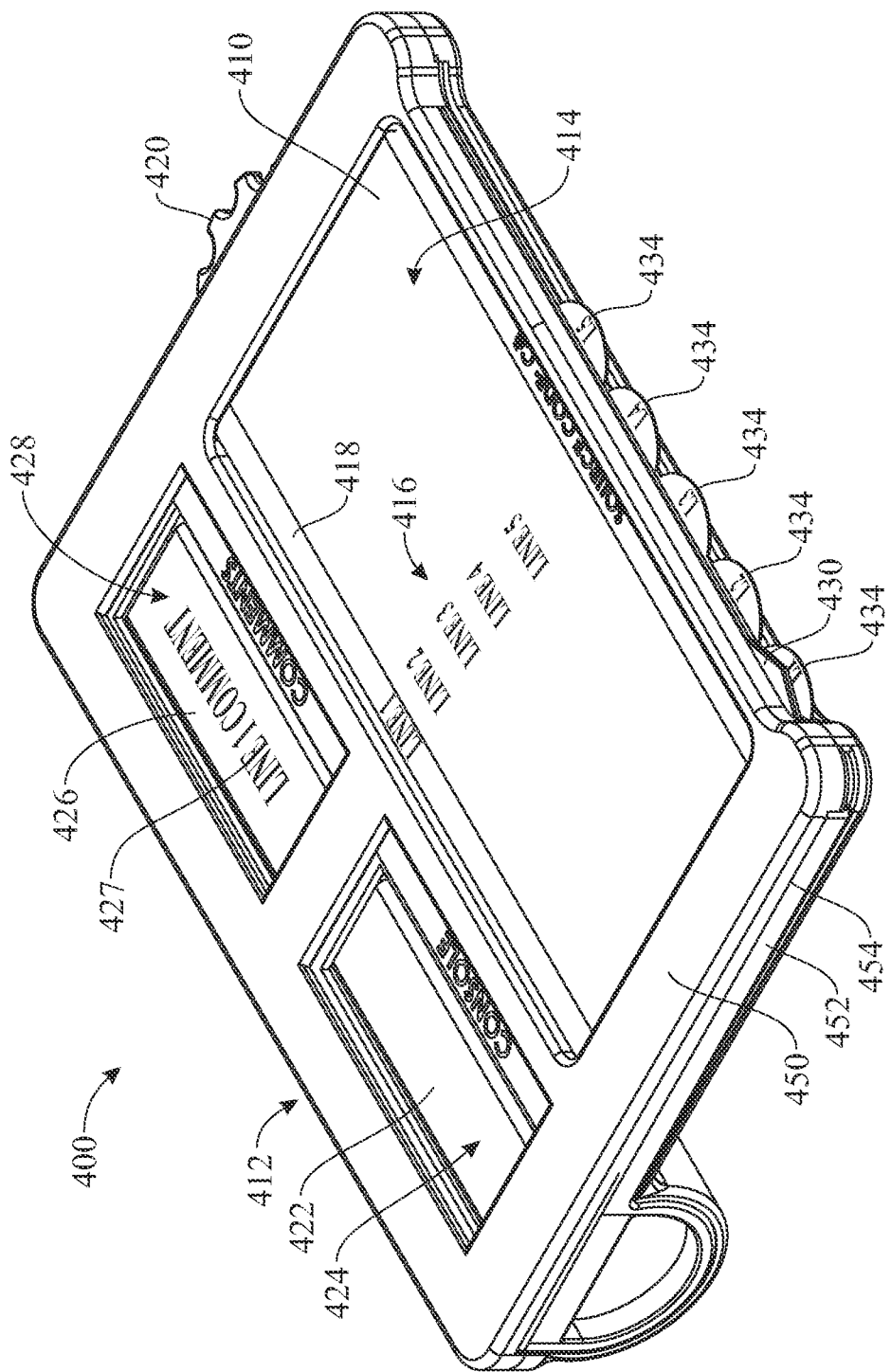
FIG. 12 presents a top, front isometric view of a device for teaching and learning computer programming in accordance with a second illustrative embodiment of the present invention.

With reference initially to FIG. 12, a device for learning and teaching computer programming, hereinafter referred to as device 400, is illustrated in accordance with a second exemplary embodiment of the present invention. Similarly to device 100 of FIGS. 1-11, the device 400 of the present embodiment is provided to instruct people in the art of computer programming, by illustrating and simultaneously explaining source code purpose and execution one line at a time, as in real life computer program and program execution.

Similarly to the previous embodiment, the device 400 of the present embodiment includes an enclosure 412, which carries a source code panel 410 comprising a plurality of lines of code 416 in accordance with a computer programming language. The plurality of lines of code 416 are visible from outside the enclosure 412, such as by having the source code panel 410 provided within the enclosure 412 and visible through a first window 414 of the enclosure 412, wherein the plurality of lines of code 416 are provided on a surface of the source code panel 410 facing the first window 414. The device 400 also includes a coding line bar 418, movably carried by the enclosure 412 and translatable along the plurality of lines of code 416 to sequentially hover over and extend across each line of code 416 of the plurality of lines of code 416. For example, as in the previous embodiment, the coding line bar 418 may be translatable along the first window 414 of the enclosure 412. The coding line bar 418 may be at least partially see-through to allow a user to read the line of code 416 through the coding line bar 418. The enclosure 412 may further include second and third windows 424 and 428, respectively.

Also similarly to the previous embodiment, the device 400 includes one or more movable members which are movably carried by the enclosure 412 and movable in synchronization or coordination with the coding line bar 418. Each movable member is configured to selectively adopt a plurality of positions, wherein each position of the plurality of positions corresponds to a respective line of code 416 of the plurality of lines of code 416.

For example, as in the previous embodiment, the one or more movable members may include a movable pointer 430 configured to selectively align with a series of pull-out tabs 434, each pull-out tab 434 comprised in a respective extractable panel 436 which is extendably and retractably housed within the enclosure 412 and associated to a respective line of code 416 of the plurality of lines of code 416. As shown in FIG. 12, the pull-out tab 434 of each extractable panel 436 protrudes from the enclosure 412 when the extractable panel 436 is retracted within the enclosure 412. The pull-out tab 434 is graspable by a user's hand to pull out the extractable panel 436 from the enclosure 412 and allow a user to read information printed or otherwise provided on the extractable panel 436 and associated to the corresponding line of code 416.

Also similarly to the previous embodiment, the one or more movable members of the present embodiment may include a comment member 426. In at least one position of the plurality of positions of the comment member 426, a readable comment 427 provided on the comment member 426 is visible from outside the enclosure 412 and provides information specific to the respective line of code 416 of the plurality of lines of code 416 corresponding with said at least one position. For instance, as shown in FIGS. 12 and 13, when the coding line bar 418 is hovering over the first line of code of the plurality of lines of code 416, a first readable comment 427 (e.g., "LINE 1 COMMENT") provided on the comment member 426 and providing information specific to the first line of code may be visible through the third window 428 of the enclosure 412.

As in the previous embodiment, the device 400 comprises a user-operable control 420 (e.g., a control wheel), carried by the enclosure 412 and manually operable by a user. The user-operable control 420 is connected to the coding line bar 418 and to the one or more movable members (e.g., the movable pointer 430 and comment member 426). Operation of the user-operable control 420 is configured to translate the coding line bar 418 along the plurality of lines of code 416 and to simultaneously move the one or more movable members along the plurality of positions that each one of them may adopt, such that, when the coding line bar 418 is selectively arranged over each line of code 416, each movable member of the one or more movable members is arranged at a position of the respective plurality of positions which corresponds to the highlighted line of code 416.

Also similarly to the previous embodiment, the device 400 of the present embodiment includes an output member 422 movably carried by the enclosure 412. The output member 422 comprises one or more readable output texts, each of which corresponds to a respective line of code 416 and provides a readable representation of a real life output of the corresponding line of code 416. Each output text of the output member 422 is visible when the coding line bar 418 is arranged over the line of code 416 corresponding to the output text. For instance, the output text may be visible through the second window 424 of the enclosure 412.

Though not specifically shown, it should be understood that operation of the user-operable control 420, coding line bar 418, movable pointer 430, output member 422 and comment member 426 may be provided by mechanisms similar or the same as those heretofore described with reference to the previous embodiment, for instance and without limitation.

As best shown in FIG. 14, the enclosure 412 of the present embodiment comprises a first housing 450 and a second housing 452 disconnectably attachable to the first housing 450. For instance and without limitation, the second housing 452 may be removably insertable within the first housing 450, such as through a side opening 454 formed in the first housing 450. In some embodiments, the first housing 450 may carry the user-operable control 420, the coding line bar 418, and the movable pointer 430, as well as associated mechanisms for converting a movement of the user-operable control 420 into a movement of the coding line bar 418 and movable pointer 430. The first, second and third windows 414, 424 and 428 may be formed in the first housing 450. In some embodiments, the second housing 452 may carry the source code panel 410, output member 422, the comment member 426, the extractable panels 436 and associated pull-out tabs 434, as well as mechanisms relating the movement of the comment member 426 and output member 422 to one another. I.e., the elements related to the specific programming language and lines of code 416 may be carried by the second housing 452, while elements related to operating the device 400, and responsively highlighting each line of code 416 and pointing to a specific pull-out tab may be carried by the first housing 450. When the second housing 452 is inserted into the first housing 450, the device 400 may function as was heretofore described with reference to the previous embodiment; for example, the coding line bar 418 is translatable along the plurality of lines of code 416 when the second housing 452 is inserted within the first housing 450. Once the second housing 452 is removed from the first housing 450, another compatible second housing 452 may be inserted and subsequently used with the same first housing 450. In some embodiments, the device 400 may take the form of a "learning kit" including a first housing 450 and a plurality of second housings 452 interchangeably mountable to the first housing 450; each second housing 452 may include different lines of code 416 of a same or different computer programming language. By means of this learning kit, a user may intuitively, conveniently and cost-effectively learn a variety of computer programming instructions and/or computer programming languages.

In summary, the disclosed devices provide a novel way of teaching coding to people without the downfalls and dangers of the current open ended and electronic screen devices currently available.

Alternative embodiments are contemplated to those shown and described heretofore. For example, in an alternative embodiment, the control mechanism may be augmented with a preferably electrical, motorized system to perform the above described rotations. Alternatively or additionally, the control mechanism may consist of or include rack-and-pinion mechanisms configured to convert the rotational movement of the control wheel into translational movement of the coding line bar and/or movable pointer. In another example, more than one source code panel, comment member and/or output member may be provided in different embodiments of the invention. Furthermore, embodiments are contemplated in which the enclosure may have different shapes. Alternatively or additionally, it is contemplated that the enclosure may carry more than one source code panel, more than one comments member and/or more than one output member. In a non-limiting example, the enclosure could be octagonal and include a respective source code panel, a respective comments member and a respective output member visible on each respective face of the eight faces of the octagonal enclosure.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A device for teaching or learning computer programming, the device comprising:
    an enclosure;
    a source code panel carried by the enclosure, the source code panel comprising a plurality of lines of code in accordance with a computer programming language, the plurality of lines of code visible from outside the enclosure;
    a coding line bar, movably carried by the enclosure and translatable along the plurality of lines of code to sequentially hover over and extend across each line of code of the plurality of lines of code;
    one or more movable members, wherein each movable member is movably carried by the enclosure and configured to selectively adopt a plurality of positions, wherein each position of the plurality of positions corresponds to a respective line of code of the plurality of lines of code; and
    a user-operable control, carried by the enclosure and manually operable by a user, the user-operable control connected to the coding line bar and to the one or more movable members, wherein operation of the user-operable control is configured to translate the coding line bar along the plurality of lines of code and to simultaneously move the one or more movable members along the plurality of positions such that, when the coding line bar is selectively arranged over each line of code, each movable member of the one or more movable members is arranged at a position of the respective plurality of positions corresponding to said each line of code.

2. The device of claim 1, wherein the enclosure comprises a first housing and a second housing, the second housing disconnectably attachable to the first housing, wherein the second housing carries the source code panel.

3. The device of claim 2, wherein the second housing is removably insertable within the first housing, and further wherein the coding line bar is translatable along the plurality of lines of code when the second housing is inserted within the first housing.

4. The device of claim 2, wherein the first housing carries the user-operable control and coding line bar.

5. The device of claim 2, wherein the second housing carries at least one movable member of the one or more movable members.

6. The device of claim 1, wherein the source code panel is provided within the enclosure and visible through a window of the enclosure, wherein the plurality of lines of code are provided on a surface of the source code panel facing the window, and further wherein the coding line bar is translatable along the window.

7. The device of claim 6, wherein the coding line bar is arranged within the enclosure, facing the window.

8. The device of claim 1, wherein the coding line bar is at least partially see-through to allow each line of code to be visible through the coding line bar when the coding line bar hovers over and extends across said each line of code.

9. The device of claim 1, wherein the coding line bar and one or more movable members are spring-biased towards respective initial positions corresponding to a first line of code of the plurality of lines of code.

10. The device of claim 9, wherein the coding line bar is lockable at each line of code of the plurality of lines of code.

11. The device of claim 1, wherein at least one movable member of the one or more movable members is rotatably carried by the enclosure and rotatable to adopt the plurality of positions.

12. The device of claim 11, wherein said at least one movable member is arranged within the enclosure and visible from outside the enclosure through a window formed in the enclosure.

13. The device of claim 1, wherein at least one movable member of the one or more movable members is translatably carried by the enclosure and translatable to adopt the plurality of positions.

14. The device of claim 1, wherein the one or more movable members comprise a comment member, wherein, in at least one position of the plurality of positions of the comment member, a readable comment provided on the comment member is visible from outside the enclosure and provides information specific to the respective line of code of the plurality of lines of code corresponding with said at least one position.

15. The device of claim 1, wherein the enclosure houses a plurality of extractable panels, each extractable panel comprising a respective pull-out tab protruding from the enclosure when said each extractable panel is retracted within the enclosure, wherein the respective pull-out tab is graspable by a user's hand to pull out said each extractable panel from the enclosure, and further wherein at least one of the plurality of extractable panels comprises readable information relative to a respective line of code of the plurality of lines of code.

16. The device of claim 15, wherein the one or more movable members comprise a movable pointer, wherein, in each position of the plurality of positions of the movable pointer, the movable pointer is aligned with the pull-out tab of the extractable panel corresponding to the respective line of code of the plurality of lines of code.

17. The device of claim 1, wherein the user-operable control comprises a manually-rotatable wheel.

18. The device of claim 1, further comprising an output member movably carried by the enclosure, the output member comprising one or more readable output texts, each output text corresponding to a respective line of code of the plurality of lines of code and providing a readable representation of a real life output of said line of code, said each output text visible when the coding line bar is arranged over the respective line of code corresponding to said each output text.

19. A device for teaching or learning computer programming, the device comprising:
an enclosure;
a source code panel carried by the enclosure, the source code panel comprising a plurality of lines of code in accordance with a computer programming language, the plurality of lines of code visible from outside the enclosure;
a coding line bar, movably carried by the enclosure and translatable along the plurality of lines of code to sequentially hover over and extend across each line of code of the plurality of lines of code;
a plurality of extractable panels, extendably and retractably carried by the enclosure, each extractable panel comprising a respective pull-out tab protruding from the enclosure when said each extractable panel is retracted within the enclosure, wherein the respective pull-out tab is graspable by a user's hand to pull out said each extractable panel from the enclosure, wherein at least one of the plurality of extractable panels comprises readable information relative to a respective line of code of the plurality of lines of code;
one or more movable members, wherein each movable member is movably carried by the enclosure and configured to selectively adopt a plurality of positions, wherein each position of the plurality of positions corresponds to a respective line of code of the plurality of lines of code, the one or more movable members comprising a comment member and a movable pointer; and
a user-operable control, carried by the enclosure and manually operable by a user, the user-operable control connected to the coding line bar and to the one or more movable members, wherein operation of the user-operable control is configured to translate the coding line bar along the plurality of lines of code and to simultaneously move the one or more movable members along the plurality of positions such that, when the coding line bar is selectively arranged over each line of code, each movable member of the one or more movable members is arranged at a position of the respective plurality of positions corresponding to said each line of code; wherein
when the user-operable control is arranged over a selected line of code of the plurality of lines of code and the one or more movable members are arranged in respective positions of the plurality of positions corresponding to said selected line of code, the comment member provides a visible and readable comment thereon which provides information specific to the selected line of code, and the movable pointer is aligned with the pull-out tab of the extractable panel corresponding to the selected line of code.

20. A device for teaching or learning computer programming, the device comprising:
an enclosure;
a source code panel carried by the enclosure, the source code panel comprising a plurality of lines of code in accordance with a computer programming language, the plurality of lines of code visible from outside the enclosure;
a coding line bar, movably carried by the enclosure and translatable along the plurality of lines of code to sequentially hover over and extend across each line of code of the plurality of lines of code, wherein the coding line bar is at least partially see-through to allow each line of code to be visible through the coding line bar when the coding line bar hovers over and extends across said each line of code;
a plurality of extractable panels, extendably and retractably carried by the enclosure, each extractable panel comprising a respective pull-out tab protruding from the enclosure when said each extractable panel is retracted within the enclosure, wherein the respective pull-out tab is graspable by a user's hand to pull out said each extractable panel from the enclosure, wherein at least one of the plurality of extractable panels comprises readable information relative to a respective line of code of the plurality of lines of code;
one or more movable members, wherein each movable member is movably carried by the enclosure and configured to selectively adopt a plurality of positions, wherein each position of the plurality of positions corresponds to a respective line of code of the plurality of lines of code, the one or more movable members comprising a comment member and a movable pointer; and a user-operable control, carried by the enclosure and manually operable by a user, the user-operable control connected to the coding line bar and to the one or more movable members, wherein operation of the user-operable control is configured to translate the coding line bar along the plurality of lines of code and to simultaneously move the one or more movable members along the plurality of positions such that, when the coding line bar is selectively arranged over each line of code, each movable member of the one or more movable members is arranged at a position of the respective plurality of positions corresponding to said each line of code; wherein when the user-operable control is arranged over a selected line of code of the plurality of lines of code and the one or more movable members are arranged in respective positions of the plurality of positions corresponding to said selected line of code, a readable comment provided on the comment member is visible from outside the enclosure and provides information specific to the selected line of code, and the movable pointer is aligned with the pull-out tab of the extractable panel corresponding to the selected line of code.

* * * * *